3,639,427
NOVEL 1,2,3,4-TETRAHYDRO - (AND 1,2,3,4,12,13-HEXAHYDRO) CYCLOPENTA[c][1]BENZOPYRANS
Raj K. Razdan, Belmont, Felix E. Granchelli, Arlington, and Harry G. Pars, Lexington, Mass., assignors to Arthur D. Little, Inc., Cambridge, Mass.
No Drawing. Continuation-in-part of application Ser. No. 642,192, May 29, 1967. This application Jan. 8, 1970, Ser. No. 1,536
Int. Cl. C07d 7/18
U.S. Cl. 260—345.3    3 Claims

ABSTRACT OF THE DISCLOSURE

New 1,2,3,4 - tetrahydrocyclopenta[c][1]benzopyrans and 1,2,3,4,12,13 - hexahydrocyclopenta[c][1]benzopyrans having C.N.S. activity.

---

This application is a continuation-in-part of our Ser. No. 642,192 filed May 29, 1967, now abandoned.

This invention relates to novel chemical compositions of matter known in the art of chemistry as 1,2,3,4-tetrahydrocyclopenta[c][1]benzopyrans and 1,2,3,4,12,13-hexahydrocyclopenta[c][1]benzopyrans having the respective Formulas I and II:

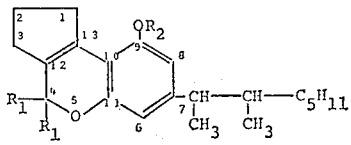

I

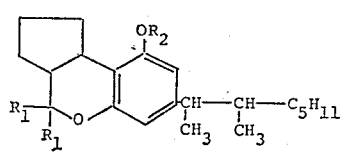

II and to the preparation of these compounds using 4-oxo-9-hydroxy-7-(3-methyl-2-octyl) - 1,2,3,4 - tetrahydrocyclopenta[c][1]benzopyran as an intermediate and having the formula:

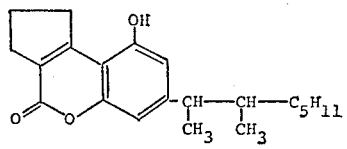

III

In the compounds of Formulas I and II above, $R_1$ is lower-alkyl, and $R_2$ is hydrogen, lower-alkyl, lower-alkanoyl, carbamyl, N-lower-alkylcarbamyl, N,N-di-lower-alkylcarbamyl or phosphonyl.

As used herein, the term "lower-alkyl" means saturated, monovalent aliphatic radicals including straight or branched-chain radicals of from one to six carbon atoms, as illustrated by, but not limited to methyl, ethyl, propyl, isopropyl, butyl, sec.-butyl, amyl, hexyl, and the like.

As used herein, the term "lower-alkanoyl" means saturated, monovalent aliphatic radicals derived from a monocarboxylic acid, including straight or branched-chain radicals of from one to six carbon atoms, as illustrated by, but not limited to formyl, acetyl, propionyl, α-methylpropionyl, butyryl, hexanoyl, and the like.

The compounds of Formula I where $R_2$ is hydrogen, are prepared by reacting 4-oxo-9-hydroxy-7-(3-methyl-2-octyl) - 1,2,3,4 - tetrahydrocyclopenta[c][1]benzopyran, having the Formula III above, with a lower-alkyl magnesium halide as illustrated by the equation:

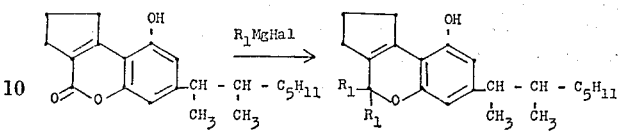

where $R_1$ has the meaning given above and Hal represents halogen. The reaction is carried out in an organic solvent inert under the conditions of the reaction. Suitable solvents are diethyl ether, dibutyl ether, tetrahydrofuran, anisole, pyridine, benzene, and the like. It is preferred to add a solution of the 4-oxo-9-hyroxy-7-(3-methyl-2-octyl) - 1,2,3,4 - tetrahydrocyclopenta[c][1]benzopyran to a solution of the Grignard reagent in anisole.

The 4 - oxo-9-hydroxy-7(3-methyl-2-octyl)-1,2,3,4-tetrahydrocyclopenta[c][1]benzopyran of Formula III in turn is prepared by reacting a 2-carbo-lower-alkoxycyclopentanone of Formula IV with 5-(3-methyl-2-octyl)resorcinol of Formula V. The reaction is carried out either in a mixture of concentrated sulfuric acid and phosphorus oxychloride, or in phosphorus oxychloride either alone or in an organic solvent, for example benzene or toluene, or in the presence of other acidic condensation agents such as aluminum chloride, hydrogen chloride, or polyphosphoric acid, and is illustrated by the equation:

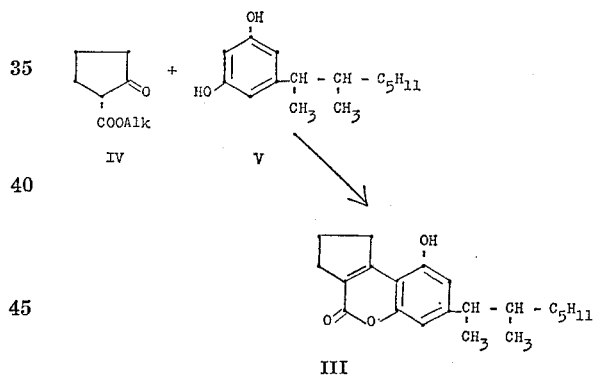

where Alk is lower-alkyl.

The 4,4-di-lower-alkyl-7-(3-methyl-2-octyl)-1,2,3,4,12,13,-hexahydrocyclopenta[c][1]benzopyrans of Formula II are prepared by reducing with hydrogen over a suitable catalyst the 4,4-di-lower-alkyl-7-(3-methyl-2-octyl)-1,2,3,4 - tetrahydrocyclopenta[c][1]benzopyrans of Formula I where $R_1$ and $R_2$ have the meanings given above. The reaction is carried out in an organic solvent inert under the conditions of the reaction, for example methanol, ethanol, isopropanol, and the like. Suitable catalysts include palladium-on-charcoal, platinum, Raney nickel, and the like. A preferred catalyst is Raney nickel.

The ester and ether derivatives of the compounds of Formulas I and II, that is the compounds where $R_2$ is lower-alkyl, lower-alkanoyl, carbamyl, N-lower-alkylcarbamyl, N,N-di-lower-alkylcarbamyl, or phosphonyl, are prepared by reacting the corresponding compounds where $R_2$ is hydrogen, preferably in the presence of a basic catalyst, with a lower-alkyl halide, to produce the compounds where $R_2$ is lower-alkyl; with a lower-alkanoic anhydride (or mixed anhydride), to produce the compounds where $R_2$ is lower-alkanoyl; with a molar equivalent amount of phosgene followed by reaction of the resulting chloroformate with ammonia, a lower-alkylamine, or a di-lower-alkylamine, to produce the compounds where $R_2$ is, respectively, carbamyl, N-lower-alkylcarbamyl, or N,N-di-loweralkylcarbamyl; or with one molar equivalent amount of phosphorus oxychloride followed by reaction of the resulting dichlorophosphinate with aqueous sodium or potassium carbonate, to produce the compounds where $R_2$ is phosphonyl. Suitable solvents are benzene, toluene, xylene, and the like, and suitable basic catalysts are alkali metal carbonates, bicarbonates, or hydroxides, dimethylaniline, pyridine, and the like.

The compounds of Formulas I and II have been shown to posses marked C.N.S. antidepressant activity as evidenced by the primary mouse screen test which induced gross overt changes with intravenous administration of these compounds. In these standard tests observations were made of psychomotor activity, reactivity to stimuli, and ability to perform normal non-conditional motor tasks (see Irwin, Animal and Clinical Pharmacologic Techniques in Drug Evaluation, Year Book Medical Publishers, Inc., Chicago, Illinois, pp. 36–54 (1964)). An $MED_{50}$ of 0.42 mg./kg. and an $LD_{50}$ of greater than 100 mg./kg. indicated a high therapeutic ratio. The compounds were also evaluated in overt behavioral tests in cats and monkeys. Taming and tranquilization at doses less than 1 mg./kg. were observed. The results of these tests indicate the usefulness of the compounds as psychotherapeutic agents.

The compounds can be prepared for use by incorporating them in unit dosage form as tablets or capsules for oral administration either alone or in combination with suitable adjuvants such as calcium carbonate, starch, lactose, talc, magnesium stearate, gum acacia, and the like. Alternatively they can be formulated for oral or intramuscular administration in aqueous alcohol, glycol, or oil solutions or oil-water emulsions in the same manner as conventional medicinal substances are prepared.

The molecular structures of the compounds of the invention were assigned on the basis of study of their infrared, ultraviolet and NMR spectra and their transformation products, and confirmed by the correspondecne between calculated and found values for the elementary analyses for representative examples.

The following examples will further illustrate the invention without, however, limiting it thereto.

EXAMPLE 1

4,4-dimethyl-9-hydroxy-7-(3-methyl-2-octyl)-1,2,3,4-tetrahydrocyclopenta[c][1]benzopyran (A) 4 - oxo-9-hydroxy-7-(3-methyl-2-octyl)-1,2,3,4-tetrahydrocyclopenta[c][1]benzopyran.—A mixture of 8.5 g. (0.05 mole) of 2-carbethoxycyclopentanone, 11.6 g. (0.05 mole) of 5-(3-methyl-2-octyl)-resorcinol, and 5.6 g. (0.037 mole) of phosphorus oxychloride in 50 ml. of benzene was heated under reflux for five hours. The mixture, which had turned deep red, was cooled and poured into ice-water containing an excess of sodium carbonate, and the mixture was then extracted with ether. The combined organic extracts were washed with water, dried, and evaporated to dryness to give a solid which was recrystallized once from an ethyl acetate/petroleum ether mixture and once from methanol containing a few drops of water to give 4-oxo-9-hydroxy-7-(3-methyl-2-octyl)-1,2,3,4-tetrahydrocyclopenta[c][1]benzopyran, M.P. 154–156° C.

Analysis.—Calcd. for $C_{21}H_{28}O_3$ (percent): C, 76.79; H, 8.58. Found (percent): C, 76.83; H, 8.62.

(B) 4,4 - dimethyl - 9-hydroxy-7-(3-methyl-2-octyl)-1,2,3,4 - tetrahydrocyclopenta[c][1]benzopyran.—A solution of 3.28 g. (0.01 mole) of 4 - oxo-9-hydroxy-7-(3-methyl-2 - octyl) - 1,2,3,4 - tetrahydrocyclopenta[c][1]-benzopyran in 30 ml. of benzene was added to a refluxing solution of methyl magnesium iodide prepared from 2.4 g. (0.1 mole) of magnesium turnings and 14.2 g. (0.1 mole) of iodomethane in 30 ml. of ether. The mixture was refluxed for sixteen hours and decomposed with an ice and ammonium chloride mixture. The organic layer was separated, the aqueous layer extracted with benzene, and the combined organic extracts washed with water and dried. The solution was taken to dryness, and the residue taken into n-heptane, and boiled with a few drops of hydriodic acid for twenty minutes. When the virgorous reaction which occurred had subsided, the solution was cooled, decolorized with charcoal, and evaporated to dryness. The residual gum was distilled at 0.05 mm. (pot temperature 230° C.) in a short path still, giving 1.9 g. of 4,4-dimethyl-9 - hydroxy-7-(3-methyl-2-octyl)-1,2,3,4-tetrahydrocyclopenta[c][1]benzopyran, as an amber-colored liquid.

Analysis.—Calcd. for $C_{23}H_{34}O_2$ (percent): C, 80.65; H, 10.01. Found (percent): C, 80.59; H, 9.96.

EXAMPLE 2

4,4-diethyl - 9 - hydroxy-7-(3-methyl-2-octyl)-1,2,3,4-tetrahydrocyclopenta[c][1]benzopyran is prepared by reaction of 4 - oxo-9-hydroxy-7-(3-methyl-2-octyl)-1,2,3,4-tetrahydrocyclopenta[c][1]benzopyran with ethyl magnesium bromide in ether, using the manipulative procedure described above in Example 1B.

EXAMPLE 3

4,4 - di - (1 - hexyl)-9-hydroxy-7-(3-methyl-2-octyl)-1,2,3,4 - tetrahydrocyclopenta[c][1]benzopyran is prepared by reaction of 4 - oxo - 9-hydroxy-7-(3-methyl-2-octyl) - 1,2,3,4 - tetrahydrocyclopenta[c][1]benzopyran with n-hexyl magnesium bromide in ether, using the manipulative procedure described above in Example 1B.

EXAMPLE 4

4,4 - dimethyl - 9 - hydroxy - 7 - (3-methyl-2-octyl)-1,2,3,4,12,13 - hexahydrocyclopenta[c][1]benzopyran By reduction of 4,4-dimethyl-9-hydroxy-7-(3-methyl-2 - octyl)-1,2,3,4-tetrahydrocyclopenta[c][1]benzopyran with hydrogen over a Raney nickel catalyst in an organic solvent, for example ethanol, there can be prepared 4,4-dimethyl - 9 - hydroxy-7-(3-methyl-2-octyl)-1,2,3,4,12,13-hexahydrocyclopenta[c][1]benzopyran.

EXAMPLE 5

4,4 - diethyl - 9 - hydroxy - 7 - (3-methyl-2-octyl)-1,2,3,4,12,13 - hexahydrocyclopenta[c][1]benzopyran is prepared by reduction of 4,4 - diethyl - 9-hydroxy-7-(3-methyl - 2 - octyl) - 1,2,3,4-tetrahydrocyclopenta[c][1]-benzopyran with hydrogen over a Raney nickel catalyst according to the procedure described above in Example 4.

EXAMPLE 6

4,4 - di - (1 - hexyl) - 9 - hydroxy-7-(3-methyl-2-octyl)-1,2,3,4,12,13 - hexahydrocyclopenta[c][1]benzopyran is prepared by reduction of 4,4-di-(1-hexyl)-9-hydroxy-7-(3 - methyl-2-octyl)-1,2,3,4-tetrahydrocyclopenta[c][1]-benzopyran with hydrogen over a Raney nickel catalyst according to the procedure described above in Example 4.

EXAMPLE 7

9-acetoxy-4,4-dimethyl-7-(3-methyl-2-octyl)-1,2,3,4-tetrahydrocyclopenta[c][1]benzopyran By reacting 4,4 - dimethyl - 9-hydroxy-7-(3-methyl-2-octyl) - 1,2,3,4 - tetrahydrocyclopenta[c][1]benzopyran with acetic anhydride, there is obtained 9-acetoxy-4,4-dimethyl - 7 - (3-methyl-2-octyl)-1,2,3,4-tetrahydrocyclopenta[c][1]benzopyran.

EXAMPLE 8

4,4-dimethyl-9-methoxy-7-(3-methyl-2-octyl)-1,2,3,4-tetrahydrocyclopenta[c][1]benzopyran By reacting 4,4 - dimethyl-9-hydroxy-7-(3-methyl-2-octyl) - 1,2,3,4 - tetrahydrocyclopenta[c][1]benzopyran with methyl iodide in the presence of sodium ethoxide, there is obtained 4,4-dimethyl-9-methoxy-7-(3-methyl-2-octyl)-1,2,3,4-tetrahydrocyclopenta[c][1]benzopyran.

EXAMPLE 9

9-carbamyloxy-4,4-dimethyl-7-(3-methyl-2-octyl)-1,2,3,4-tetrahydrocyclopenta[c][1]benzopyran By reacting 4,4 - dimethyl-9-hydroxy-7-(3-methyl-2-octyl) - 1,2,3,4 - tetrahydrocyclopenta[c][1]benzopyran with an equimolar amount of phosgene in the presence of dimethylaniline, and reacting the resulting chloroformate with liquid ammonia, there is obtained 9-carbamyloxy-4,4-dimethyl - 7 - (3-methyl-2-octyl)-1,2,3,4-tetrahydrocyclopenta[c][1]benzopyran.

EXAMPLE 10

4,4 - dimethyl - 9-(N-methylcarbamyloxy)-7-(3-methyl-2 - octyl) - 1,2,3,4 - tetrahydrocyclopenta[c][1]benzopyran By reacting 4,4 - dimethyl-9-hydroxy-7-(3-methyl-2-octyl) - 1,2,3,4 - tetrahydrocyclopenta[c][1]benzopyran with an equimolar amount of phosgene in the presence of dimethylaniline, and reacting the resulting chloroformate with methylamine, there is obtained 4,4-dimethyl-9-(N-methylcarbamyloxy) - 7 - (3 - methyl - 2 - octyl) - 1,2,3,4-tetrahydrocyclopenta[c][1]benzopyran.

EXAMPLE 11

9 - (N,N - dimethylcarbamyloxy) - 4,4-dimethyl-7-(3-methyl - 2 - octyl) - 1,2,3,4 - tetrahydrocyclopenta[c][1]benzopyran By reacting 4,4 - dimethyl - 9-hydroxy-7-(3-methyl-2-octyl) - 1,2,3,4 - tetrahydrocyclopenta[c][1]benzopyran with an equimolar amount of phosgene in the presence of dimethylaniline, and reacting the resulting chloroformate with dimethylamine, there is obtained 9-(N,N-dimethylcarbamyloxy) - 4,4-dimethyl-7-(3-methyl-2-octyl)-1,2,3,4-tetrahydrocyclopenta[c][1]benzopyran.

EXAMPLE 12

4,4-dimethyl-9-phosphonyloxy-7-(3-methyl-2-octyl)-1,2,3,4 - tetrahydrocyclopenta[c][1]benzopyran By reacting 4,4 - dimethyl-9-hydroxy-7-(3-methyl-2-octyl) - 1,2,3,4 - tetrahydrocyclopenta[c][1]benzopyran with one molar equivalent amount of phosphorus oxychloride in toluene in the presence of pyridine, and reacting the resulting dichlorophosphinate with aqueous potassium carbonate, there is obtained 4,4-dimethyl-9-phosphonyloxy - 7 - (3-methyl-2-octyl)-1,2,3,4-tetrahydrocyclopenta[c][1]benzopyran.

EXAMPLE 13

9-acetoxy-4,4-dimethyl-7-(3-methyl-2-octyl)-1,2,3,4,12,13-hexahydrocyclopenta[c][1]benzopyran By reacting 4,4 - dimethyl-9-hydroxy-7-(3-methyl-2-octyl) - 1,2,3,4,12,13-hexahydrocyclopenta[c][1]benzopyran with acetic anhydride, there is obtained 9-acetoxy-4,4 - dimethyl - 7-(3-methyl-2-octyl)-1,2,3,4,12,13-hexahydrocyclopenta[c][1]benzopyran.

EXAMPLE 14

4,4-dimethyl-9-methoxy-7-(3-methyl-2-octyl)-1,2,3,4,12,13-hexahydrocyclopenta[c][1]benzopyran By reacting 4,4-dimethyl-9-hydroxy - 7 - (3 - methyl - 2-octyl) - 1,2,3,4,12,13 - hexahydrocyclopenta[c][1]benzopyran with methyl iodide in the presence of sodium ethoxide, there is obtained 4,4-dimethyl - 9 - methoxy - 7 - (3-methyl-2-octyl) - 1,2,3,4,12,13 - hexahydrocyclopenta[c][1]benzopyran.

EXAMPLE 15

9-carbamyloxy-4,4-dimethyl-7-(3-methyl-2-octyl)-1,2,3,4,12,13-hexahydrocyclopenta[c][1]benzopyran By reacting 4,4-dimethyl-9-hydroxy - 7 - (3 - methyl - 2-octyl) - 1,2,3,4,12,13 - hexahydrocyclopenta[c][1]benzopyran with an equimolar amount of phosgene in the presence of dimethylaniline, and reacting the resulting chloroformate with liquid ammonia, there is obtained 9-carbamyloxy-4,4-dimethyl-7-(3-methyl-2 - octyl) - 1,2,3,4,12,13-hexahydrocyclopenta[c][1]benzopyran.

EXAMPLE 16

4,4-dimethyl-9-(N-methylcarbamyloxy) - 7 - (3 - methyl-2 - octyl) - 1,2,3,4,12,13 - hexahydrocyclopenta[c][1]benzopyran By reacting 4,4-dimethyl-9-hydroxy-7 - (3 - methyl - 2-octyl) - 1,2,3,4,12,13 - hexahydrocyclopenta[c][1]benzopyran with an equimolar amount of phosgene in the presence of dimethylaniline, and reacting the resulting chloroformate with methylamine, there is obtained 4,4-dimethyl-9-(N - methylcarbamyloxy) - 7 - (3 - methyl - 2-octyl) - 1,2,3,4,12,13 - hexahydrocyclopenta[c][1]benzopyran.

EXAMPLE 17

9-(N,N-dimethylcarbamyloxy) - 4,4 - dimethyl - 7 - (3-methyl-2-octyl)-1,2,3,4,12,13 - hexahydrocyclopenta[c][1]benzopyran By reacting 4,4-dimethyl-9-hydroxy-7 - (3 - methyl - 2-octyl) - 1,2,3,4,12,13 - hexahydrocyclopenta[c][1]benzopyran with an equimolar amount of phosgene in the presence of dimethylaniline, and reacting the resulting chloroformate with dimethylamine, there is obtained 9-(N,N-dimethylcarbamyloxy)-4,4 - dimethyl - 7 - (3 - methyl - 2-octyl) - 1,2,3,4,12,13 - hexahydrocyclopenta[c][1]benzopyran.

EXAMPLE 18

4,4-dimethyl-9-phosphonyloxy-7-(3 - methyl - 2 - octyl)-1,2,3,4,12,13-hexahydrocyclopenta[c][1]benzopyran By reacting 4,4-dimethyl-9-hydroxy-7 - (3 - methyl - 2-octyl) - 1,2,3,4,12,13 - hexahydrocyclopenta[c][1]benzopyran with one molar equivalent amount of phosphorus oxychloride in toluene in the presence of pyridine, and reacting the resulting dichlorophosphinate with aqueous potassium carbonate, there is obtained 4,4 - dimethyl - 9-phosphonyloxy-7-(3-methyl-2-octyl)-1,2,3,4,12,13 - hexahydrocyclopenta[c][1]benzopyran.

We claim:

1. A compound having the formula:

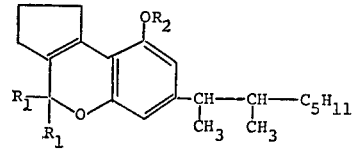

or

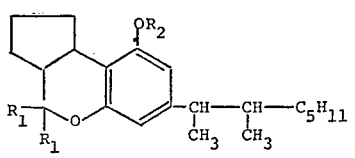

where $R_1$ is lower-alkyl; and $R_2$ is hydrogen, lower-alkyl, lower-alkanoyl, carbamyl, N-lower-alkylcarbamyl, N,N-di-lower-alkylcarbamyl, or phosphonyl.

2. A compound according to claim 1 where $R_2$ is hydorgen.

3. 4,4-dimethyl-9-hydroxy-7-(3 - methyl - 2 - octyl)-1,2,3,4 - tetrahydrocyclopenta[c][1]benzopyran according to claim 2 where $R_1$ as lower-alkyl is methyl.

References Cited

FOREIGN PATENTS 651,653   4/1951   Great Britain _____ 260—345.3

JOHN M. FORD, Primary Examiner

U.S. Cl. X.R.

260—343.2; 424—283